(12) United States Patent
Paxton et al.

(10) Patent No.: US 7,516,759 B2
(45) Date of Patent: Apr. 14, 2009

(54) AUTONOMOUS MOVING MICROSTRUCTURES

(75) Inventors: Walter Paxton, Boalsburg, PA (US); Ayusman Sen, State College, PA (US); Thomas E. Mallouk, State College, PA (US); Jeffrey M. Catchmark, Bellefonte, PA (US)

(73) Assignee: The Penn State Research Foundation, University Park, PA (US)

( * ) Notice: Subject to any disclaimer, the term of this patent is extended or adjusted under 35 U.S.C. 154(b) by 1173 days.

(21) Appl. No.: 10/784,432

(22) Filed: Feb. 23, 2004

(65) Prior Publication Data

US 2005/0281682 A1    Dec. 22, 2005

Related U.S. Application Data

(60) Provisional application No. 60/450,194, filed on Feb. 24, 2003.

(51) Int. Cl.
*F15C 1/00* (2006.01)
*F16H 35/00* (2006.01)

(52) U.S. Cl. .......................... 137/803; 74/640; 422/50

(58) Field of Classification Search .................. 74/640; 422/50
See application file for complete search history.

(56) References Cited

U.S. PATENT DOCUMENTS

| 5,426,942 | A | 6/1995 | Suzuki | 60/721 |
| 6,645,455 | B2 | 11/2003 | Margrave et al. | 423/447.1 |
| 2002/0159943 | A1 | 10/2002 | Smalley et al. | 423/447.1 |
| 2003/0142901 | A1 | 7/2003 | Lahann et al. | 385/18 |
| 2003/0215844 | A1 | 11/2003 | Chapsky et al. | 435/6 |
| 2004/0007695 | A1 | 1/2004 | Anquetil et al. | 252/500 |

FOREIGN PATENT DOCUMENTS

| WO | WO 00/22101 | | 4/2000 |
| WO | WO 0022101 A2 | * | 4/2000 |
| WO | WO 03/025145 A2 | | 3/2003 |
| WO | WO 03/101955 A2 | | 12/2003 |

OTHER PUBLICATIONS

R.F. Ismagilov et al., Autonomous Movement and Self-Assembly, 41 Angew. Chem. Int. Ed. 652-654 (2004).*
"Autonomous Movement of Striped Nanorods," W.F. Paxton, K. C. Kistler, C. C. Olmeda, Ayusman Sen, Yanyan Cao, Sarah K. St. Angelo, Thomas E. Mallouk, Paul E. Lamert, and Vincent H. Crespit, Departments of Chemistry and Physics, The Pennsylvania State University, University Park, PA 16802, 2004.
"Autonomous Movement and Self-Assembly," R.F. Ismagilov, A. Schwatrz, N. Bowden, G. M. Whitesides, Angew. Chem. Int. Ed. 2002, 41, 652-654.

* cited by examiner

*Primary Examiner*—Glenn Caldarola
*Assistant Examiner*—Randy Boyer
(74) *Attorney, Agent, or Firm*—Gifford, Krass, Sprinkle, Anderson & Citkowski, P.C.

(57) ABSTRACT

A microstructure includes a catalyst region, and a non-catalyst region proximate to the catalyst region. The catalyst region induces a chemical reaction of a fluid component when the microstructure is located within a fluid medium containing the fluid component. The chemical reaction induces relative motion between the fluid medium and the microstructure, which can be used to provide, for example, autonomous directional movement, rotation of microgears, microfluidic devices, and novel sensor configurations. In one example, a palladium catalyst is used, and the fluid medium is an aqueous solution of hydrogen peroxide.

41 Claims, 9 Drawing Sheets

FIG - 7
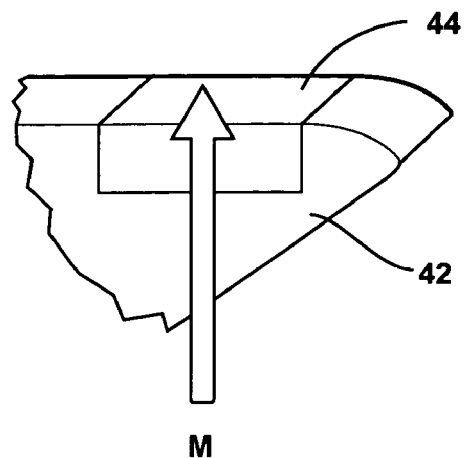
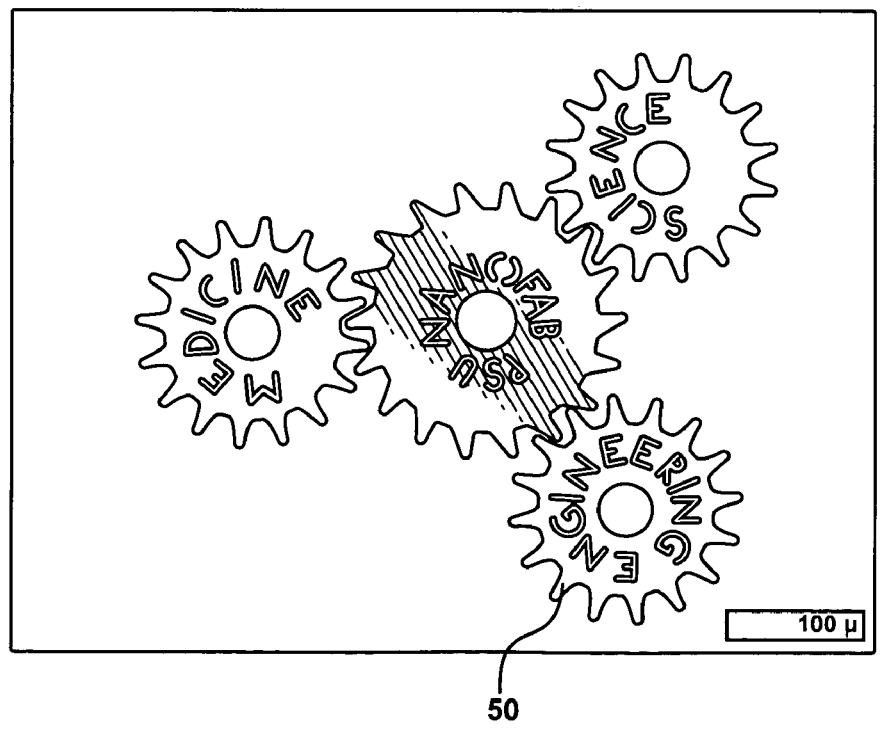
FIG - 8

AUTONOMOUS MOVING
MICROSTRUCTURES

REFERENCE TO RELATED APPLICATION

This patent application claims benefit from U.S. provisional patent application Ser. No. 60/450,194, filed Feb. 24, 2003, the contents of which are incorporated in its entirety herein by reference.

FIELD OF THE INVENTION

The invention relates to autonomous moving mechanisms, in particular to microscale structures such as motors powered by catalytic reactions.

BACKGROUND OF THE INVENTION

Microscale (including nanoscale) moving structures are currently the subject of intense interest due, in part, to their potential applications in micromachines. The creation of miniature engines that can convert chemical energy to motion is one of the great remaining challenges of nanotechnology.

There is great difficulty of delivering energy from a macroscopic source to an individual microscale structure. As used here, the term microscale includes nanoscale structures (or nanostructures). Hence, it would be advantageous if external energy sources were not necessary, for example through the use of autonomous structures that do not require an external energy source.

Enzymatic catalysis of spontaneous reactions is known in biology, such as the hydrolysis of ATP and GTP. Microscale motors driven by catalysis have not been demonstrated in non-enzymatic systems. Nanotube-based actuators are also known, but movement is powered by an external, macroscopic energy source.

Whitesides and coworkers have used hydrogen peroxide decomposition to propel larger-scale structures on a water surface, using the recoil force of oxygen ($O_2$) bubbles, for example as described in R. F. Ismagilov, A. Schwatrz, N. Bowden, G. M. Whitesides, "Autonomous Movement and Self-Assembly," Angew. Chem. Int. Ed. 2002, 41, 652-654. However, the generation of macroscopic bubbles could interfere with the operation of micromachinery, especially nanomachinery.

U.S. Patent App. Pub. No. 2003/0215844 to Chapsky et al. describes single molecule detection of bioagents, using DNA hybridization techniques. U.S. Pat. App. Pub. No. 2003/0142901 to Lahann et al. describes surfaces having reversibly switchable surface properties. U.S. Pat. App. Pub. No. 2003/0159943A1 to Smalley et al. describes methods of forming arrays of single wall nanotubes. Int. Pat. App. Pub. No. WO03/101955A2 to Anquetil et al. describes molecular actuators. Int. Pat. App. Pub. No. WO03/025145A2 to Evans describes a basic genetic operating system for an autonomous prototrophic nanomachine. Int. Pat. App. Pub. No. WO00/22101 to Montemagno describes integration of a molecular motor in a nanomechanical system. U.S. Pat. No. 6,645,455 to Margrave et al. describes methods of synthesizing self-assembled arrays of carbon nanotubes. U.S. Pat. No. 5,426,942 to Suzuki et al. describes methods of driving microbodies along a substrate that is hydrophobic at low temperatures and hydrophilic at high temperatures.

However, the prior art fails to disclose autonomous microstructures having catalyst regions such as described herein. Patents and patent applications referenced in this specification are incorporated herein by reference.

SUMMARY OF THE INVENTION

Microscale (including nanoscale) structures, or microstructures, having one or more spatially tailored catalyst regions can provide linear and rotational motion in a suitable fluid medium. Reactions occurring proximate to the catalyst region create anisotropic body and/or surface forces that can be used to propel the structures.

As used in relation to the examples described below, the prefix 'micro-', for example as used in the term microstructure, refers to structures having one or more feature sizes of typically less than approximately 10 mm, for example less than 1 mm. For example, a microgear may have a diameter less than 10 mm. In this specification, the term microstructure will be used so as to include nanostructures. A nanostructure (for example, a nanorod) is a structure having a feature size (such as rod diameter) conveniently measured in nanometers (for example, a dimension less than 10 micrometers or microns). However, application of the concepts described herein is not limited to such small-scale structures.

The term hydrophobicity will be used to refer to a surface wetting property, including hydrophobic and hydrophilic surfaces. Hence the concept of modifying the hydrophobicity of a surface can include changing a hydrophobic surface to a hydrophilic surface, or vice versa.

BRIEF DESCRIPTION OF THE DRAWINGS

FIG. 7 is a schematic further illustrating a gear tooth;

FIG. 8 shows a multi-gear system in the process of being fabricated;

DETAILED DESCRIPTION

Nanorods

Nanorod particles were fabricated with spatially defined regions that catalyzed a spontaneous reaction in an aqueous solution of hydrogen peroxide ($H_2O_2$). The reaction resulted in directed motion along the rod axis.

Striped platinum/gold (Pt/Au) nanorods, 370 nm in diameter and containing 1 µm long Pt and Au segments, were synthesized electrochemically in alumina membranes. Platinum and gold were chosen because platinum is an active hydrogen peroxide decomposition catalyst and gold is not. The rods were characterized by TEM and dark-field optical microscopy. In the latter, the Au and the Pt segments were clearly distinguishable by color, allowing the direction of motion to be monitored.

A suspension of rods in aqueous hydrogen peroxide was prepared and a known volume (25 microliters) of this mixture was placed in a sealed well on a clean glass slide and topped with a glass cover slip. Rods remained suspended in the fluid above the glass slide due to surface charge repulsions between the rods and glass. In aqueous hydrogen peroxide solutions, these nanorods moved in the direction of their long axis with the Pt end forward.

The mechanism of movement involves platinum-catalyzed decomposition of hydrogen peroxide to oxygen, which on dissolution lowers the surface tension of water around the platinum end. Thus, a surface tension gradient is formed, which propels the rods. The velocity can be increased by increasing the concentration of hydrogen peroxide and decreased by adding organic solvents or surfactants that decrease the surface tension of the medium.

Figure 1:
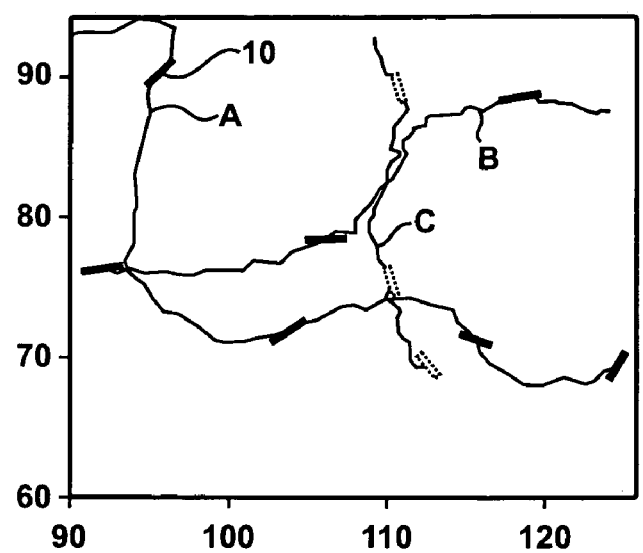
FIG. 1 illustrates trajectory plots of three Pt/Au rods (denoted A, B, and C) over 5 seconds in 2.5% aqueous peroxide (axes scales in microns)

FIG. 1 illustrates the movement of three such rods (such as 10) over time, as determined by video monitoring. The scale of the axes is in microns. The paths of the three rods are denoted A, B, and C, with the rod orientation shown at various positions along the path. The rods had a length of 2 microns, and comprised a 1 micron long catalyst segment (Pt) and a 1 micron long non-catalyst segment (Au).

Forward movement minimizes drag, and the catalytic reaction took place on only one end (the Pt end). The direction of movement was opposite to that expected if oxygen generated at the Pt end impelled the rod by momentum recoil or through a pressure increase. The dimensions of the nanorods are similar to bacteria and their average speed (10 body lengths/sec) is also comparable to multi-flagella bacteria, such as bacillus cereus. Diffusion coefficients and rod velocities were determined by analyzing captured video clips of each experiment.

The catalytic reaction appeared to create and maintain a solute concentration gradient along the length of the rod. For catalytic nanorods (nanorods including one or more catalyst regions), interfacial tension gradients appear to be the likely mechanism whereby the chemical gradient drives the mechanical motion.

Rods can be fabricated having a variety of sizes. For example, rods were made with lengths in the range 2-10 microns, and diameters from approximately 70-400 nm. Individual metal segments were approximately 1-8 microns long. However, other sizes can be fabricated. Analogous palladium/gold rods were also made, having a palladium catalyst region and a gold non-catalyst region, and showing similar behavior.

Nanorod Motion

In aqueous hydrogen peroxide solutions, Pt/Au rods move in the direction of their long axis with the platinum end forward. Movement in the axial direction is preferred because the drag force is minimized in this direction, and the catalytic reaction responsible for the movement takes place on only one end. The direction of movement is opposite to that expected if the driving mechanism is the recoil induced by macroscopic bubble generation, and macroscopic bubbles are not observed near the nanorods in our experiment, suggesting a different mechanism. Diffusion coefficients obtained for platinum/gold rods in aqueous hydrogen peroxide are very different from those obtained for the same rods in pure water or gold rods in aqueous hydrogen peroxide and depend on the duration of the sampling interval.

Rod movement can be expressed in terms of diffusion coefficients or center-to-center displacement speeds. Diffusion coefficients were determined experimentally using trajectory diffusion methods and the two-dimensional diffusion coefficient is defined as $D=<d^2>/4t$, where d is the center to center displacement in the time interval t. At time scales much longer than the viscous relaxation time for water ($<<10^{-13}$ s) the diffusion coefficient associated with Brownian motion is independent of the time interval. In pure water, rod movement is Brownian in nature and diffusion coefficients for rods obtained by trajectory analysis agree with earlier results.

The directionality of rod motion is defined as the cosine of the angle between the direction that the nanorod is pointed and the actual direction that it moves. Thus, a nanorod that continues to move in the direction it is pointed has a directionality of 1 ($\cos 0°$), whereas a nanorods moving backwards or perpendicular to the direction pointed have directionalities of −1 and 0, respectively. The product of the directionality and speed yields the velocity component along the rod axis, $v_z$. The Brownian component of the velocity should become less important as the propulsive component increases, so that directionality increases from 0 to a value approaching 1. In pure water, the directionality was close to zero, as is expected of particles exhibiting pure Brownian motion.

As shown in Table 1 below, the directionality and speed both increase with increasing hydrogen peroxide concentration, until limiting values are reached at approximately 3.3% hydrogen peroxide. For comparison, the average $v_z$ values for 2 micron Au and Pt rods at 3.3% hydrogen peroxide concentration were 0.5 and 2.7 micron/s, respectively. The movement of the Pt rods can be attributed to asymmetry in the rod geometry due to the method of nanorod fabrication. From SEM image analysis it appears that each rod has a concave end and a convex end. The rougher concave end has higher Pt surface area, resulting in more oxygen generation compared to the convex end.

TABLE 1

Effect of aqueous $H_2O_2$ concentration on the movement of 2 micron long Pt/Au rods. Concentration of rods: $3.3 \times 10^7$ rods/mL. Error limits represent 90% confidence interval.

| $H_2O_2$, wt. % | Speed (µm/s) | Time Averaged Directionality | $v_z$ (µm/s) |
|---|---|---|---|
| 4.9 | 7.7 ± 0.9 | 0.78 | 6.6 ± 1.0 |
| 3.3 | 7.9 ± 0.7 | 0.75 | 6.6 ± 0.7 |
| 1.6 | 5.6 ± 0.6 | 0.65 | 4.0 ± 0.8 |
| 0.33 | 4.9 ± 0.3 | 0.60 | 3.4 ± 0.4 |
| 0.031 | 3.9 ± 0.5 | 0.19 | 0.9 ± 0.4 |
| Pure Water | 3.7 ± 0.3 | 0.07 | 0.4 ± 0.1 |

Since, as discussed below, the speed depends on the rate of oxygen ($O_2$) formation from $H_2O_2$, the rate limiting factor may either be the diffusion of $H_2O_2$ to the Pt surface or the Pt-catalyzed decomposition of $H_2O_2$. The experimental rate of $O_2$ formation from 5% $H_2O_2$ was about 1/1000 of the limit imposed by the $H_2O_2$ diffusion rate. Thus, the rate of $O_2$ formation is limited by the turnover rate of the catalyst which, in turn, depends on the surface area of the Pt segment. Otherwise identical batches of rods grown at different plating potentials had different average velocities in hydrogen peroxide solutions, consistent with this hypothesis. This is consistent with the $O_2$ formation rate reaching a maximum value at about 5% $H_2O_2$.

Figure 2:
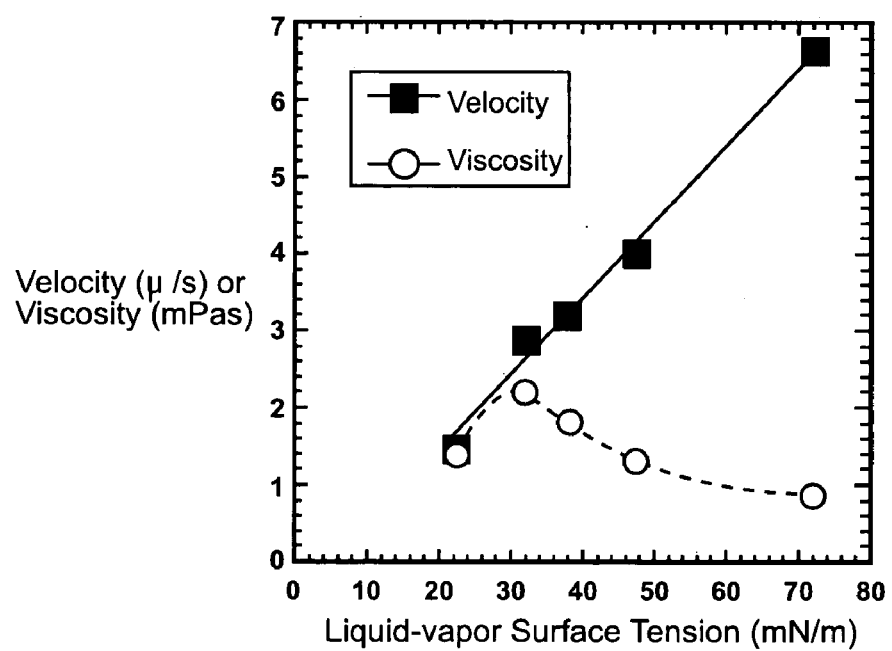
FIG. 2 shows the dependence of Pt/Au rod velocity on viscosity and liquid-vapor interfacial tension in ethanol/water solutions containing 3% $H_2O_2$.

FIG. 2 illustrates Pt/Au rod velocities (filled circles) in ethanol/water solutions containing 3% $H_2O_2$ as a function of γ (interfacial tension, alternatively liquid/vapor surface tension) for these solutions. Solution viscosity is shown by empty circles. As discussed in more detail below, this relationship supports an interfacial tension model of rod motion.

Figure 3:
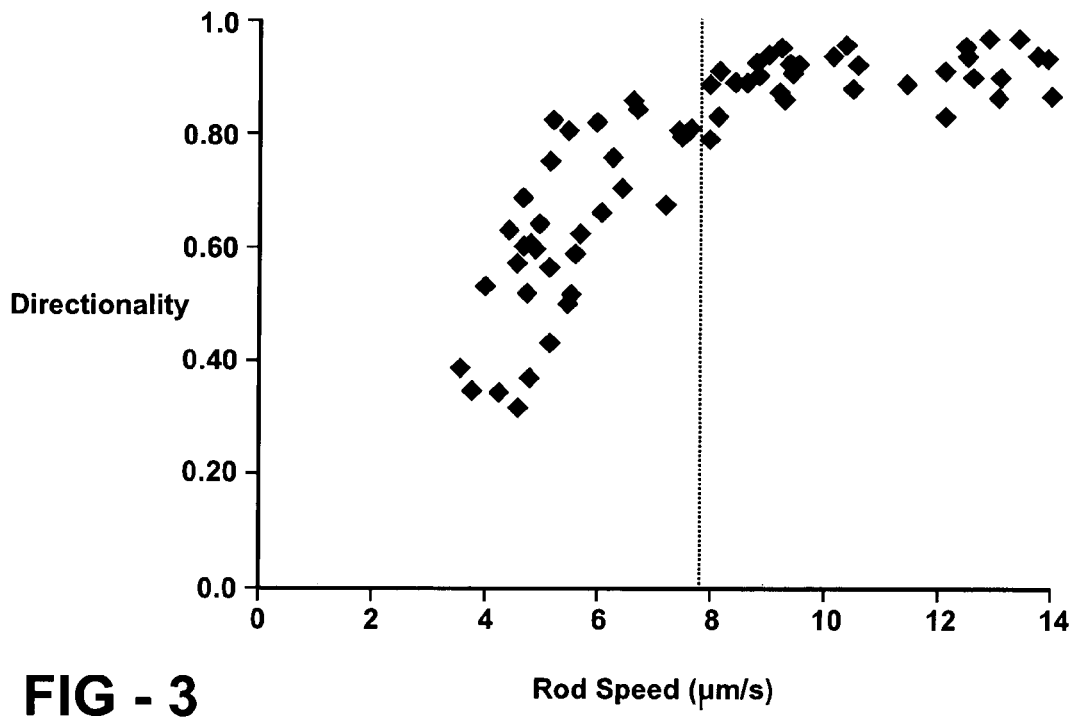
FIG. 3 illustrates the relationship between speed and directionality for platinum/gold rods in 3.3% aqueous $H_2O_2$, where the dashed line represents an average rod speed.

FIG. 3 further illustrates that the Brownian component of translational velocity becomes less important as the propulsive component increases, so that directionality increases from 0 to a value approaching 1. In pure water, the directionality is close to zero, as is expected of particles undergoing pure Brownian motion.

Figure 4:
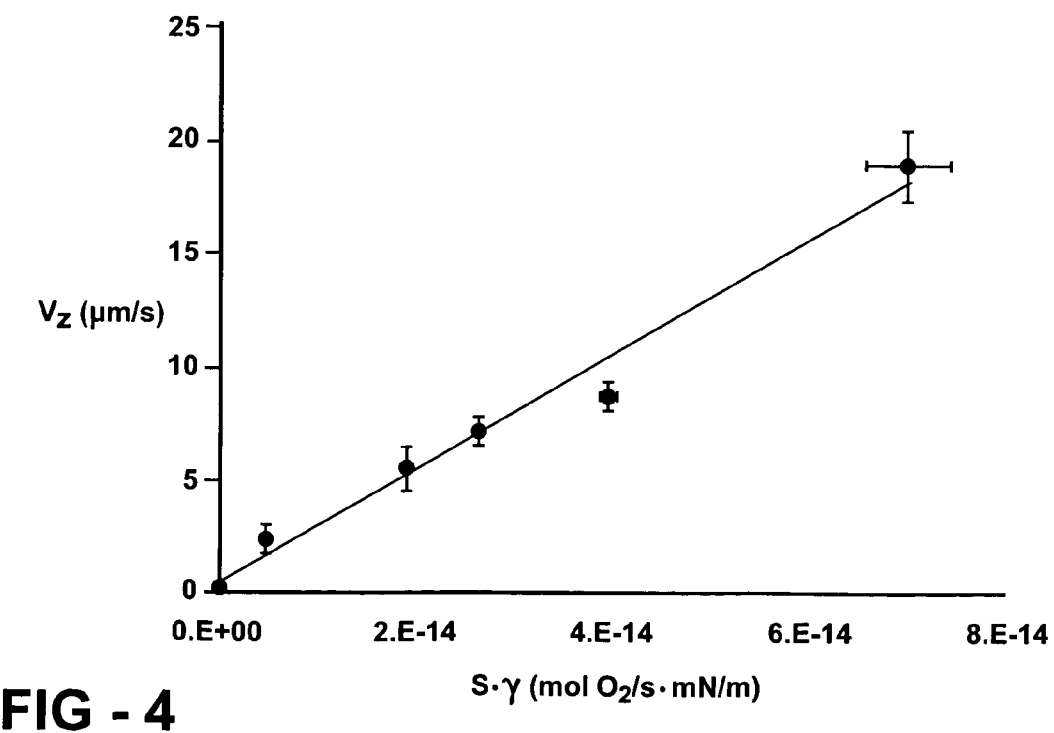
FIG. 4 shows the effect of ethanol on axial velocity, $v_z$, where $v_z$ is plotted versus the product of oxygen evolution rate per rod and solution surface tension.

FIG. 4 shows a plot of average velocity vs. the product Sγ for a sample of faster rods in ethanol-water solutions containing $H_2O_2$. Here, S is the surface area normalized oxygen generation rate and γ is the interfacial tension. The plot is linear, as expected from modeling (see equation 3 derived below). The addition of ethanol also affects μ and D, where μ is the viscosity, and D is the diffusion coefficient, but according to the Stokes-Einstein equation the product of these two parameters is constant, and thus these two effects balance each other.

Scaling, structure geometry, and surface properties can be used to modify energy efficiency, speed and direction of motion. Chemical, photochemical, and electronic switching of motion is also possible, for example by modifying the surface properties of the catalyst and/or non catalyst regions of the structure. Structures can be fabricated based on mechanical forces produced by catalytic reactions, such as gears, shuttles, roving sensors, and nanofluidic pumps and valves.

T-Shaped Assemblies

Cooperative rotational motion of T-shaped assemblies of platinum/gold rods was observed in 2.5% aqueous $H_2O_2$. By comparison, the Brownian motion observed in pure water was random and about an order of magnitude slower.

Enzyme-Powered Nanorods

Enzymes can provide very fast catalytic reactions. Esterases are representative examples of enzymes that can provide large changes in interfacial tension, since the substrate esters will be significantly less polar than the product alcohols (or phenols) and carboxylic acids. Hence, enzymatic reactions can be used for motion, sensor applications, nanofluidics, and other applications. Enzymes can be attached to, or otherwise supported by microstructures (such as nanorods, gears, and the like). Enzyme-powered structures can be provided using catalase and carbonic anhydrase. Structures such as nanorod motors can be fabricated that use internally wired glucose oxidase to derive power from glucose and oxygen (or other oxidizing agents).

Enzymes are easily linked to other proteins using a procedure known as carbodiimide coupling. In carbodiimide coupling, 1-ethyl-3-(3-dimethylaminopropyl)carbodiimide (EDC) is used to activate a carboxyl or phosphate to form an O-urea compound which is a good electrophile. For example, terminal amine groups on nanostructures can be used. In other examples, proteins can be used.

Nanorods were fabricated consisting of a 1 micron segment of Au attached to a 4 micron segment of nickel with an intervening thin layer of palladium, the latter to strengthen the link between the Au and the nickel segments. Nickel was chosen because, unlike Au, nickel does not support a thiol-based self assembled monolayer (SAM). SAMs consisting of amine terminated thiols were then assembled on the Au segment and to this catalase was attached.

Catalase was chosen because of its ability to rapidly decompose hydrogen peroxide. Aminothiols with 2 and 16-carbon linkers were employed in EDC coupling procedure. We used fluorescent tags to establish that that enzyme was bound to the Au surface. After the non-competitive tagging, we searched for enzyme functionalized rods with optical microscopy and then switched to fluorescence microscopy to find rods that were fluorescing. As a control, it was shown that in the absence of the nanorods no fluorescence was observed. Finally, it was shown that the rod-bound catalase was still active by monitoring by gas chromatography the oxygen evolved following the addition of hydrogen peroxide. The oxygen evolution rate (~4×10-15 mol/rod-sec) was found to be independent of the length of the linker and was ca. 30-100 faster than the oxygen evolution rate observed using our Pt/Au nanorods.

Hence, enzymes can be attached to nanorods, and to other nanoscale or microscale structures (such as motors, gears, shuttles, and the like). Such structures can then operate in a biological environment.

For example, glucose oxidase (GOx) can be attached to Au nanoparticles and other surfaces. These nanoparticles can efficiently deliver electrons from enzymatic reaction to a metal electrode to which they may be tethered. In this example, the electrons can be employed to reduce an appropriate substrate at the remote end and thereby influence interfacial tension. One such substrate is $Fc^+$-$(CH_2)_n$—$NMe_3^+$ (Fc=ferrocenyl). Reduction of this species to $Fc$-$(CH_2)_n$—$NMe_3^+$ in aqueous media results in significant changes in interfacial tension which can be used to move macroscopic particles. Other redox enzymes can also be used.

Hence, glucose oxidase can be used in enzyme-modified bimetallic rods, and other nanomotor structures. Under conditions of anodic control (enzyme- or substrate-limited reaction rate), the surface tension gradient can be systematically changed in this system using a series of substituted ferrocenium compounds as oxidants.

Figure 5:
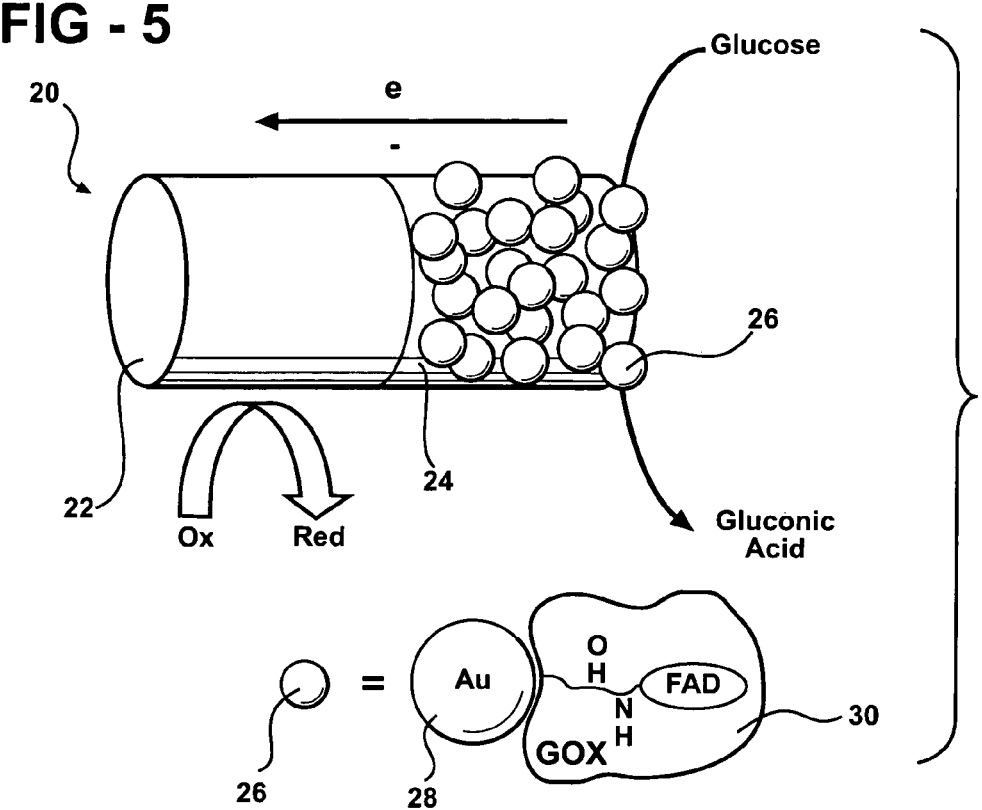
FIG. 5 illustrates a design for a glucose driven nanomotor.

FIG. 5 shows a rod generally at 20, having a first end 22 providing a redox reaction, for example through deposition of redox enzymes), and a second end coated with nanoparticles 26. The nanoparticles 26 comprise gold nanospheres 28 supporting a layer of glucose oxidase (shown schematically at 30). The first and second ends of the rod 20 have an interface 24. In one example, the second end of the rod is gold, and the first end of the rod is a metal supporting redox enzymes.

In other examples, the first and second ends of the rod can comprise a single conductive material, eliminating the interface.

Mechanical Systems

Micro/nano electro mechanical systems (MEMS/NEMS), including gear systems, one, two and three dimensional shuttles and delivery vehicles, and micro and nanofluidic pumping systems, can all potentially be powered by using microstructures including catalyst regions, for example to provide interfacial tension gradients, without the use of external magnetic, electrical, optical or gravitational fields. Moreover, a variety of heterogeneous catalytic and enzyme-based reactions can be used to create a novel class of chemical and biological sensors.

Gear Systems

Pt/Au nanorods represent a simple system for performing controlled experiments in conjunction with theoretical modeling to understand the basic principles of catalytically driven movement. Other microstructures can provide controlled motion and, depending upon the application, larger applied forces than those that can be achieved in a cylindrical geometry.

One form of controlled motion is rotational motion, which is relevant for gear and propeller/turbine systems. Gear systems can be provided to change the direction of motion, or increase torque by reducing speed.

Figure 6:
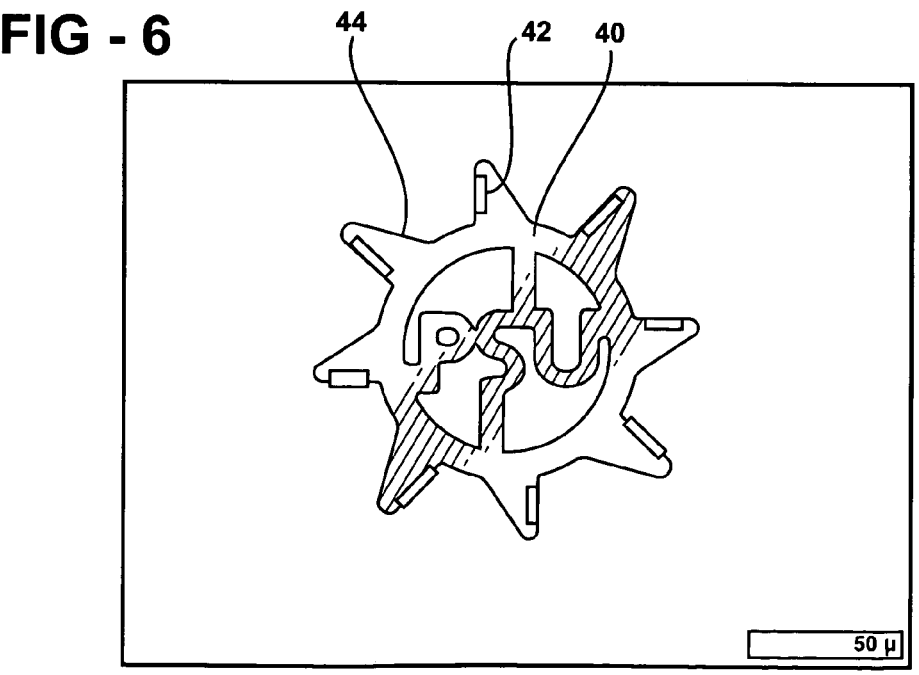
FIG. 6 shows a fabricated microgear having Pt catalyst regions on the gear teeth.

FIG. 6 shows a free gear measuring ~100 microns in diameter which provided controlled rotational motion due to interfacial tension gradients generated by a catalytic reaction. The gear 40 has a plurality of gear teeth, such as 42, each having a catalyst region 44, in this example Pt. The individual teeth on the gear were partially coated with Pt to produce a Pt/Au interface parallel to the surface of the gear. This geometry generates interfacial tension forces at each spoke.

In this example, each gear tooth has a Pt catalyst region, disposed on the forward side of the gear tooth as the tooth moves through the fluid. By modifying the hydrophobicity of non-catalyst regions of the gear tooth, the direction of rotation can be reversed.

In other examples, different catalysts materials, such as enzymes, can be used. Not all gear teeth need have a catalyst region.

FIG. 7 is a perspective rendering of the gear tooth 42 showing a Pt catalyst region 44 on the gold tooth 42 . . . The bold arrow indicates the expected direction of movement based on the nanorod studies.

The Au/Pt gear shown in FIG. 6 was fabricated by a combination of optical lithography, evaporation, and electroplating steps on a Si substrate. The gears were released from the surface by wet chemical etching of the sacrificial 0.25 microns of silicon dioxide by submersion into 1:1 HF:DI water for 15 min. The freed gears were suspended in a ~1:100 hydrogen peroxide:DI water solution. A few drops of solution containing a few gears were placed on a silicon wafer with a periodic array of posts etched into the surface spaced at ~100 microns, and were observed under an optical microscope.

Gears fabricated as described above were observed freely rotating within an aqueous solution of hydrogen peroxide. One gear (the same approximate size as the gear in FIG. 6 without the lettering in the center) rotated at ~1 sec$^{-1}$, corresponding to a linear velocity of ~300 microns/sec at the Pt-coated gear tooth. This is more than an order of magnitude faster than nanorod movement, consistent with the expected scaling with surface area (see, e.g., equation 3 derived below). The fact that larger surface forces are generated at these length scales is important in the design of more complex systems, such as shuttles and vehicles (see below). The direction of gear rotation is the same as that observed for the Pt/Au nanorods, i.e., toward the Pt side of the gear tooth.

In other embodiments, catalyst regions may be provided on one or more of the plurality gear teeth. Other gear designs are possible, as will be clear to those skilled in the mechanical art.

More complex fixed gear systems can be fabricated that are held in place with axles, frames, housings, and other structures.

FIG. 8 shows a four gear system currently in the process of being fabricated, including a plurality of gears (such as gear 50) having interlocking teeth . . .

Gears of arbitrary 2-D shape can be fabricated over a wide range of dimensions by a combination of micro- and nano-fabrication techniques.

A micromotor, including one or more microgears having catalyst and non-catalyst regions, one or more conventional microgears, and optionally other mechanical components such as axles, belts, propellers, and the like, can be fabricated, and for example used to propel a structure through a fluid medium.

Hydrophobic, Hydrophilic, and Switchable Surfaces

An interfacial tension model predicts motion in opposite directions with hydrophobic and hydrophilic non-catalyst region surfaces, such as the Au surfaces of the Pt/Au nanorods and gears. Surfaces can be modified using hydrophobic and hydrophilic self-assembled monolayers (SAMs), for example, hexanethiol and 2-mercaptoethanesulfonic acid on the non-catalyst regions. Molecules can be selectively removed from a catalyst surface by chemical oxidation or by etching. For example, gas chromatography can be used to measure oxygen production rate with suspensions of nanorods, allowing characterization of surface modification techniques.

Application of SAMs to microstructure surfaces can allow motion to be changed actively (switched on or off, or reversed in direction) on the fly. This allows fabrication of microstructures, such as motors, that can be controlled remotely by chemical signals, with light, electrically, or magnetically. All three switching modes have already been demonstrated for SAMs, and these switching methods can be adapted to catalytic microstructures. For example, it is known that the photochemical switching from the cis-to the trans-form of diazobenzene increases the free volume of the monolayer, allowing penetration of ferricyanide ions, which may modify interfacial tension. Molecules can be functionalized as necessary (e.g., with polar groups in the para position of a terminal ring) to achieve the largest photochemical change in interfacial tension.

SAMs are also known that respond to chemical signals. For example, it is known that when carboxylate-terminated SAMs bind $Ca^{2+}$ ions, they open channels for electroactive molecules to reach the surface. SAMs terminated by other molecular recognition groups have been designed by others to open similar channels in the presence of phosphate, cyclic AMP (cAMP), and other biochemically interesting analytes. These surfaces may change interfacial tension in the absence and presence of analytes, allowing switching the motion off (e.g., with $Ca^{2+}$) and back on again (e.g. with EDTA, which binds $Ca^{2+}$).

For photochemical or chemical signaling, motors can still be powered catalytically by the fuel (such as hydrogen peroxide) in solution; only a very small input of energy in the form of light or chemicals is needed to switch the properties of the SAM.

It is known that interfacial tension at a metal surface is sensitive to applied potential, and this field-driven electrowetting has previously been demonstrated as the basis for reciprocating mercury drop motors. It is also known that the hydrophilicity of carboxylate-terminated SAMs depends dramatically on applied potential. In the case where a negative potential is applied to the Au electrode, 16-mercaptohexadecanoic acid molecules will be upright exposing the carboxylate groups rendering the surface hydrophilic. At positive potential, the negatively charged head groups are drawn to the electrode surface, exposing the alkyl chains to the solution and increasing the hydrophobicity. This effect can be used as a means of switching nanomotors on or off by poising the solution at positive or negative potentials, using appropriate redox molecules in their oxidized ($Br_2$, benzoquinone) or reduced (tri(N-methyl)ammonium methylferrocene, methylviologen radical cation) forms. This approach may not be compatible with a redox "fuel" such as hydrogen peroxide, but can work in other cases, e.g. with motors that utilize a hydrolytic catalytic reaction.

Hence, catalyst-induced forces, such as the interfacial tension force, can be combined with other molecular surface modification techniques to enable the realization of entirely new classes of structures which either move in fluids or manipulate fluids without the use of any micro- or macroscale moving components. An interfacial tension gradient can be provided by the presence of a hydrophobic region adjacent to a hydrophilic one.

The hydrophobicity of surfaces can be controlled by assembling amphiphilic molecules onto a surface and using either an electrical or optical stimulus to produce a conformational change. It has been shown that spaced 16-mercaptohexadecanoic acid functionalized Au surfaces can be switched from hydrophilic to hydrophobic by applying a potential to the Au surface. These processes can be used create new structures including free moving electronically controlled vehicles and reconfigurable micro- and nanofluidic networks.

Switchable surface properties (such as hydrophobic to hydrophilic) are also described in U.S. Pat. App. Pub. No. 2003/0142901A1 to Lahann, et al.

Shuttles

Microscale and nanoscale shuttles and conveyor systems are of great interest as vehicles to transport cargo. Controllable, bidirectional movement is of particular interest.

Figure 9A:
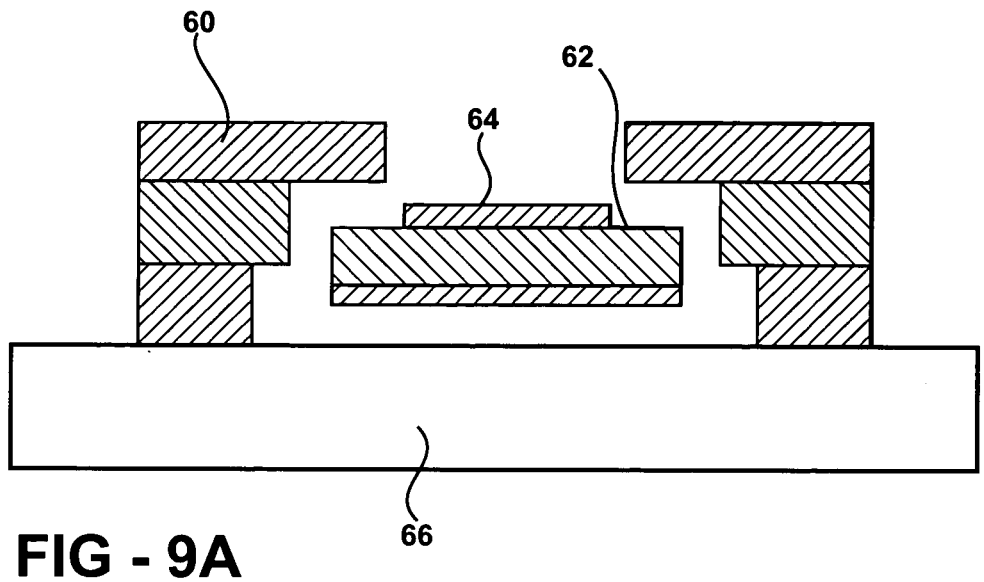
FIGS. 9A and 9B provide an end view and a top view respectively of a bi-directional shuttle having 2 catalyst regions.
Figure 9B:
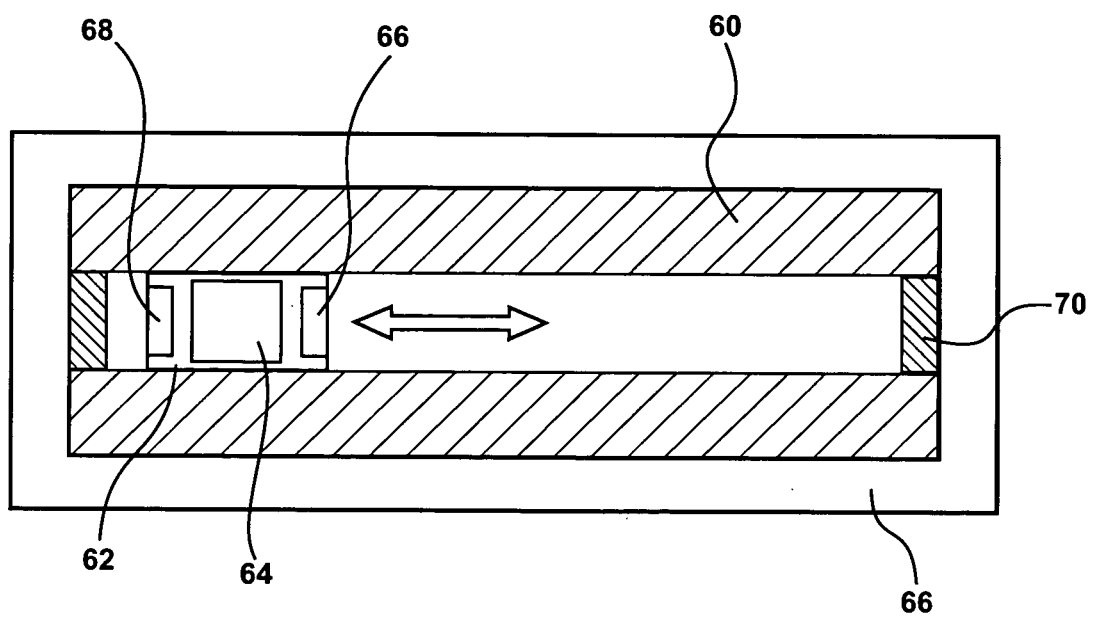

FIGS. 9A and 9B illustrate a design for a shuttle, employing interfacial tension gradients generated by two distinct catalytic reactions. FIG. 9A is a cross-sectional schematic, and FIG. 9B is a top view. The design includes shuttle guide 60, shuttle body 62, cargo 64, substrate 66, first catalyst region 66, second catalyst region 68, and end stop 70.

Shuttle motion in either direction can be provided by providing a first catalytic reaction at the first catalyst region or a second catalytic reaction at the second catalyst region. The first and second catalytic reactions provide interfacial tension gradients in opposing directions. A fluid medium can be introduced into a cavity provided by the shuttle guide, for example by immersion of the shuttle structure in the fluid medium. The fluid medium can be changed to switch from the first catalytic reaction to the second.

Examples of suitable orthogonal catalytic reactions include (a) peroxide decomposition by Pt or catalase and (b) hydration of carbon dioxide by carbonic anhydrase. Similarly, catalytic reactions generating opposite interfacial tension gradients might be used to control the direction of rotation in the gear systems.

In other examples, changes in a surface property of the non-catalyst region of the shuttle body (for example, from hydrophobic to hydrophilic) can be used to change the direction of the shuttle. Suitable switchable surface properties are discussed in more detail below. In such examples, one or more catalyst regions can be used. The catalyst region can induce an oxidation, reduction, decomposition, or other transformation of one or more fluid components of the fluid medium.

Sensors

Interfacial tension forces resulting from catalytic reactions can deflect cantilever beams or, in effect, change the loading of the beam. This effect can be used to make cantilever sensors for substances in solution that directly or indirectly affect the catalytic reaction rate or surface tension. Cantilevers with very precisely fabricated probe tips (radius ~10 nm) are used in scanning probe microscopies, including atomic force microscopy and scanning tunneling microscopy. Probes with such sharp tips coated with a catalyst or enzyme can exploit the sensitivity and resolution of these measurement techniques to sense analytes with nanoscale spatial resolution.

Catalytic or enzyme based reactions can be used in a novel kind of chemical or biochemical sensor that involves modulation of forces generated in the reaction. Cantilever type sensors (such as MEMS sensors) are known for high sensitivity, as low as parts per trillion. These sensors operate in several electronic and optical measurement modes including capacitance, piezoresistive, piezoelectric, shifting of cantilever resonance frequencies, and optical deflection of laser beams from the surface of a cantilever under deformation. All these techniques have been successfully implemented in scanning probe microscopy systems as individual or arrayed chemical/biological sensors. These effects result from forces being applied to the cantilever or from mass loading of the cantilever. Changes in interfacial tension forces that result from a molecular recognition event can be interrogated by using any of these methods. Such measurements and systems can be implemented in liquid environments for many applications including biological system interrogation (such as analyte detection).

Figure 10A:
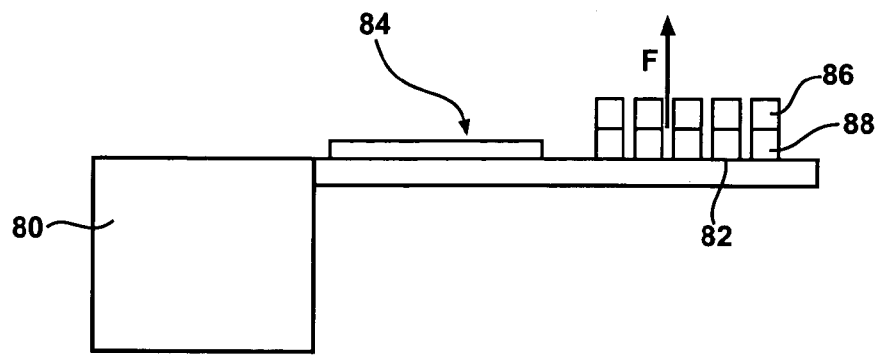
FIGS. 10A-10C each show a schematic representation of a sensor structure.
Figure 10B:
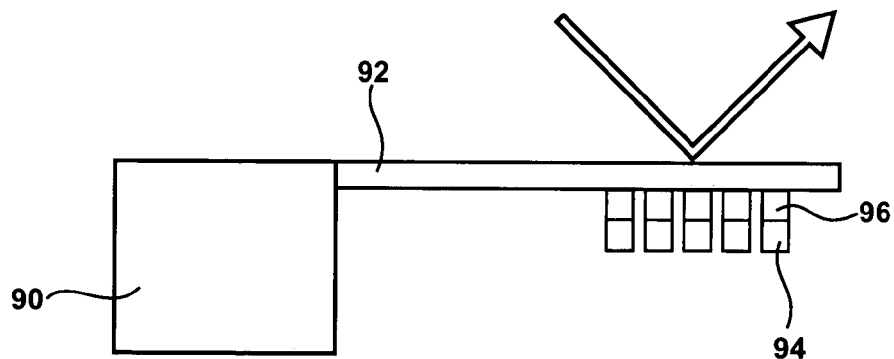
Figure 10C:
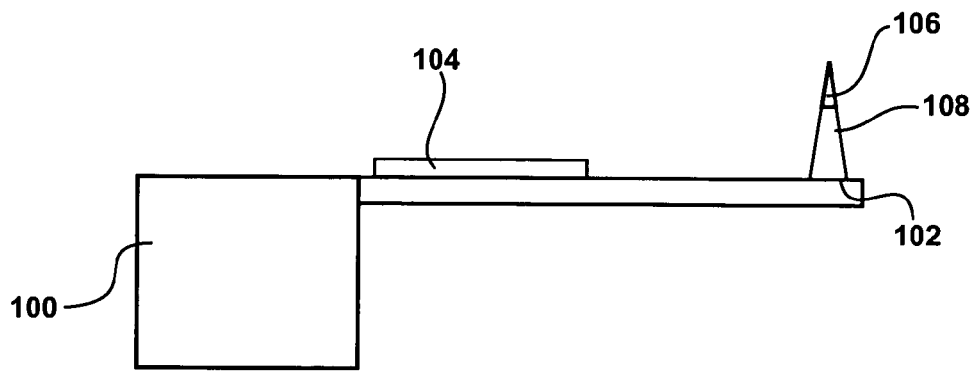

FIGS. 10A-10C show schematic representations of three sensor structures. FIG. 10A shows a piezoresistive sensor in which cantilever deflections change the resistance of the piezoresistive material. The sensor includes substrate 80, cantilever 82, and piezoelectric material 84. A plurality of (optionally elongated) tips are disposed on the cantilever, including catalyst regions such as 86, and non-catalyst regions such as 88.

FIG. 10B illustrates a sensor based on reflection of a laser beam from the cantilever surface. The sensor includes substrate 90 and cantilever 92. A plurality of (optionally elongated) tips are disposed on the cantilever, including catalyst regions such as 94, and non-catalyst regions such as 96. Deflection of the laser beam (shown as an arrow) modulates the current produced by a photodetector. The use of cantilevers with multiple catalyst-including tips allows for higher sensitivity.

FIG. 10C illustrates a sensor including substrate 100, cantilever 102, and piezoelectric material 104, the cantilever 102 supporting a single sharp probe tip fabricated at its end. The probe tip includes with a catalyst (such as a metal or enzyme) allowing measurements to be made with high spatial resolution. Such a structure can be included in an otherwise conventional scanning microscope.

Figure 11:
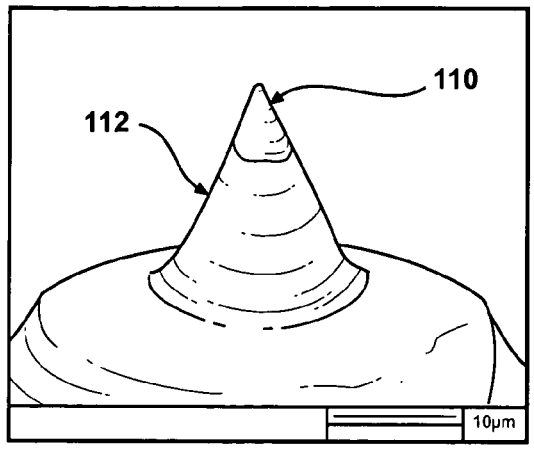
FIG. 11 shows an SEM image of a probe tip with a Pt catalyst region deposited on the tip end.

A probe tip structure, of the type illustrated in FIG. 10C, was fabricated and is illustrated in FIG. 11. The figure was prepared from a scanning electron microscope (SEM) image. Pt was deposited onto a silicon probe tip 112 coated with 5 nm of Cr and 10 nm of thermally evaporated Au. Pt was deposited onto an end portion 110 of the tip using focused ion beam assisted deposition of evaporated $(CH_3)_3(CH_3C_5H_4)Pt$. This structure is roughly conical, for catalytic generation of relatively large surface forces. However, other shapes may be used, such as pyramidal shapes, cylinders, hemispheres, and other geometric and non-geometric shapes.

Modulation of wettability on the non-catalytic Au surface of a sensor configuration may be triggered by a molecular recognition event. This can translate to a change in the force on a cantilever exerted by the catalytic reaction, which is then detected by any convenient method. For example, the Au surface can be coated by a self-assembled monolayer (SAM), and a change in the SAM layer is induced by binding of an analyte.

Figure 12A:
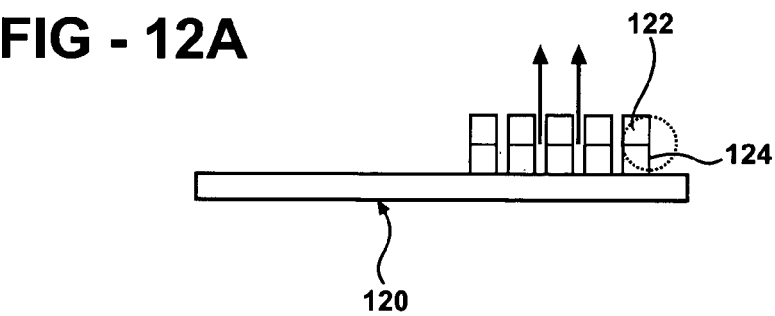
FIGS. 12A and 12B illustrate a cantilever sensor based on analyte-induced hydrophobicity changes in the non-catalyst Au-SAM surface.
Figure 12B:
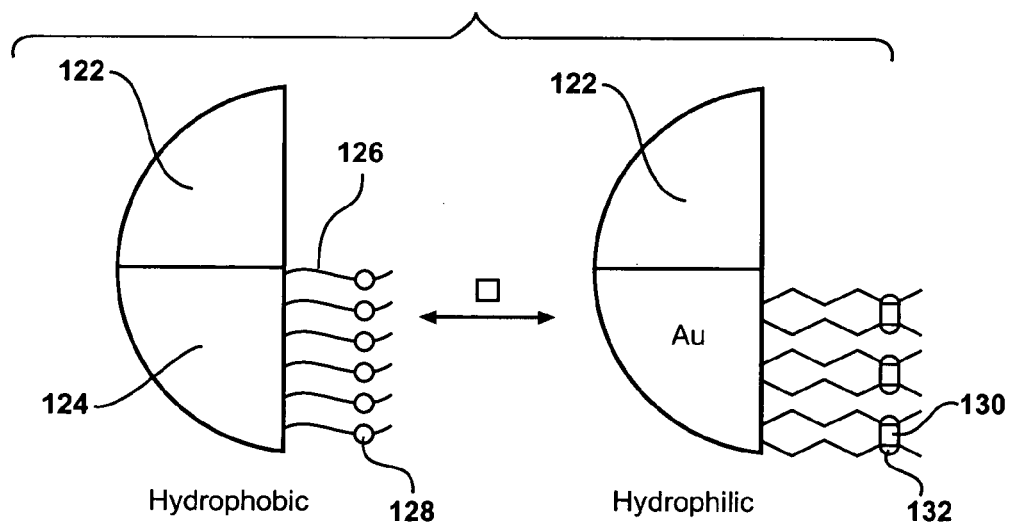

This is shown schematically in FIGS. 12A and 12B. Cantilever arm 120 supports a plurality of tips having catalyst regions 122 (such as Pt) and non-catalyst regions 124 (such as Au). The surface of the non-catalyst region is coated with a self-assembled monolayer 126, molecules of which including a ligating group 128 (shown as a circle). As shown at 126, the surface is hydrophobic. An ion or small molecule (illustrated schematically as a square such as 130, for example $Ca^{2+}$ or cAMP) binds to ligating groups (shown at 132), switching the surface wettability (or hydrophobicity) to hydrophilic.

There are various SAM/analyte combinations known in the art that can be used to implement such sensors. For example, SAMs bearing terminal carboxylate and phosphonate groups are sensitive to $Ca^{2+}$, and SAMs with alkylthiourea tail groups selectively bind phosphate. Other examples are known in the art. Surface interactions can be characterized first by measuring contact angles on planar Au/SAM surfaces, and then measuring their effect on the catalytic force in cantilever deflection experiments.

Freely Moving Vehicles

Micro and nanoscale vehicles represent the next level of complexity in catalytically powered MEMS structures. Using the switching SAMs described in more detail elsewhere and reconfigurable surface fluidic control elements such as those discussed below in relation to FIG. 16, electronically controllable shuttles and roving vehicles can be envisioned. Advantages of this architecture include scalability, small size, a fabrication process compatible with silicon integrated circuit and MEMS production and no moving parts.

Figure 13:
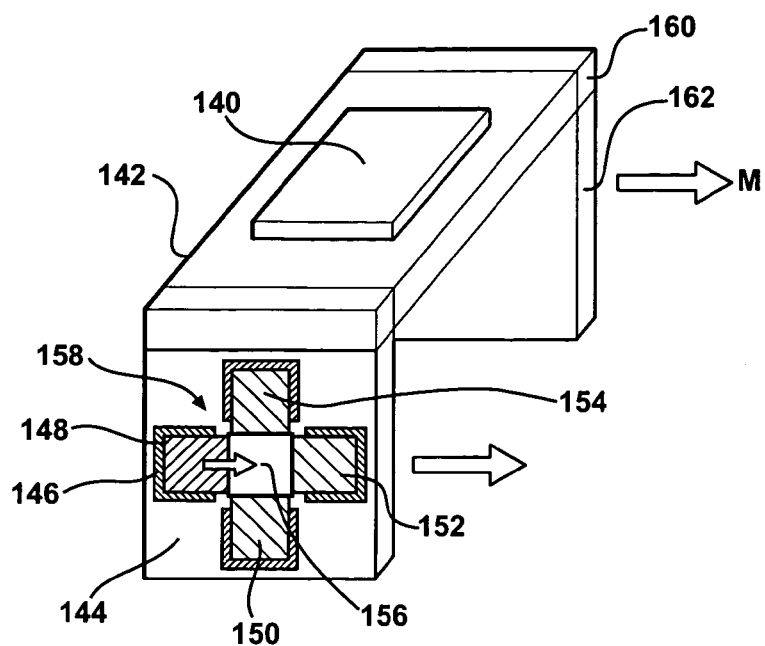
FIG. 13 is a schematic representation of a free moving vehicle whose direction of motion is controlled by modulation of the hydrophobicity of contact surfaces adjacent to the catalyst region.

A free moving vehicle design is shown in FIG. 13. The vehicle comprises cargo carrier (or sensor) 140, top frame member 142, first side member 144, non-catalyst regions 148, 150, 152, and 154, electrodes such as 146 substantially underlying the non-catalyst regions, catalyst region 156 (the catalyst and non-catalyst regions together forming a reconfigurable catalytic engine indicated generally at 158), MEMS hinge 160, and second side member 162. The second side member may also have a reconfigurable catalytic engine. A side member can also include integrated circuits with motion control electronics and/or wireless communication circuitry (e.g. for control or sensor data readout). Arrows, such as M, indicate a direction of motion.

The electrodes, such as 146, are not shown in exact register with the non-catalyst regions, such as 148, for illustrative convenience. The non-catalyst regions may be in register with the electrodes, substantially in register, or in some other configuration, for example where at least part of an electrode is covered with a non-catalyst region having controlled wettability.

In use, the wettability of the non-catalyst regions are controlled, in this example by electric potentials, so as to provide a desired direction of motion, for example by switching one or more of the non-catalyst regions from a hydrophobic to a hydrophilic surface. For example, one non-catalyst region may be hydrophobic, the other three hydophilic, or vice-versa, or some other configuration. Controlled direction in three dimensions is possible. The vehicle is capable of moving in any direction, by adjusting the hydrophobicity of non-catalyst regions proximate to the catalyst regions.

In other examples, motion can be controlled within tracks, channels, or other topographical features. A catalyst region can be surrounded by or otherwise proximate to two or more controlled wettability non-catalyst regions.

The structure can be fabricated using planar microelectronic and MEMS processes. Integrated circuits with control electronics can be incorporated by standard interconnect fabrication processes. The MEMS hinges fold the catalytic engine section perpendicular to the surface of the cargo/sensor area. Catalytic engine configurations can be designed to allow for movement with any degree of freedom.

Microfluidics Based on Catalysis

Intense research over the past decade has been directed toward the development of lab-on-a-chip microfluidic structures for transporting fluids and biological entities. It is a goal of this invention to significantly expand the capability of this field through development of new microfluidic structures such as pumps. The catalytically driven movement of particles through aqueous solutions implies, in the reference frame of the particle, the catalytically driven flow of the solution. It is thus reasonable to propose that the same catalytic processes and switching mechanisms could be used to move fluids in nano/microchannels, and to switch these catalytic pumps using chemical, photo-chemical, or electrical signals.

By Galilean invariance, the motion of a structure through a stationary fluid is equivalent to the motion of a fluid in the opposite direction past a stationary structure. Therefore, the catalytic generation of interfacial gradients can also be used to move fluids (Marangoni effect) allowing the design of pumps and valves for microfluidic (including nanofluidic) and bio-chip structures.

Figure 14:
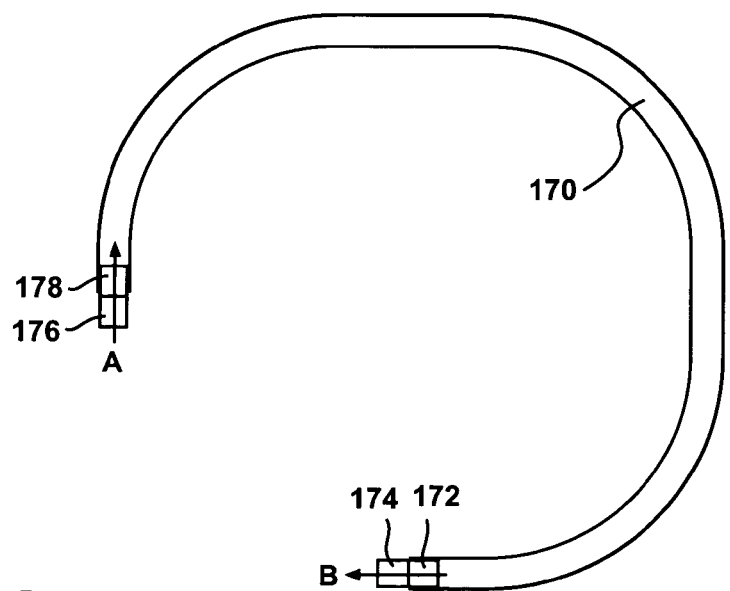
FIG. 14 illustrates a closed fluid loop pumped by catalyst metal stripes at the inlet and outlet.

FIG. 14 shows a simple design for circulating fluid in a loop with asymmetric Pt/Au films at the entrance and exit. The fluid pump system includes catalyst regions 176 and 172, in this example Pt lined tubes through which fluid flows, non-catalyst regions 174 and 178 (in this example, Au lined tubes through which fluid flows, and tube 170. The arrows A and B illustrate fluid flows from Pt to Au under the conditions of our Pt/Au nanorod/$H_2O_2$ experiments.

Similar designs are possible using glucose as a fuel (i.e. a fluid component providing a chemical reaction catalyzed by a catalyst region), with glucose oxidase immobilized on one end of each bipolar metal film. Closed-loop micro-pumps can be fabricated that are compatible with biochemical analytes. This would reduce the need for external pumps in lab-on-a chip applications.

Microfluidic channels can be fabricated in dielectrics (such as $SiO_2$ or $Si_3N_4$) by contact lithography, and a fluidic pump can be fabricated using evaporated Pt/Au stripes. Movement of fluid in channels can be visualized using suspended particles, such as latex spheres. The direction of flow can be determined by whether the products are more or less hydrophilic than the reactants.

Figure 15:
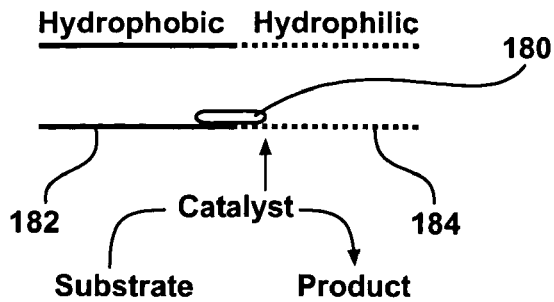
FIG. 15 illustrates a pump based on a catalyst region located at the interface between hydrophobic and hydrophilic channel regions.

FIG. 15 illustrates a portion of a microfluidic channel in cross-section. A catalyst 180 (e.g., a metal particle or enzyme) is immobilized in a channel at the interface between hydrophobic region 182 and a hydrophilic region 184. These patterns can be created photolithographically by using hydrophobic silane reagents, such as octyltrichlorosilane, to derivatize $SiO_2$. If the product lowers the interfacial tension of the solution (as in the case of hydrogen peroxide decomposition), then fluid will flow from right to left in the channel. If the product increases the interfacial tension, then the pump will operate in the opposite direction.

More complex catalytic systems that direct flows in networks can be created. For example, three catalyst (such as enzyme) driven pumps could meet at a fluidic "T." Flow could be directed in several possible ways by these pumps, depending on the combination of substrates present. Switching in these networks would exploit the high specificity of enzyme catalysts to signal flow in different directions.

Reconfigurable Biochips and Channel Free Microfluidics

Microfluidic biochips are currently having a major impact on many fields including biomedical testing and drug discovery. Microfluidic channels are key elements in these structures since they transport materials from one point to another. One drawback of this approach is that unique biochip designs are required for each application. Electronic control of fluidic pathways through the use of switchable SAMs opens up many new structure possibilities.

By using arrays of switchable SAM coated areas adjacent to catalytic sites, reconfigurable fluidic pathways can be created. The reconfigurable flow paths so generated can be used to transport bacteria, microspheres, or other particles, and can also be used to move biological or chemical materials in complex pathways for microanalytical applications. One approach to achieving this is to pattern dense arrays of Au electrodes in a matrix-addressed format, similar to the pattern used in charge coupled imaging arrays.

In one example, Au electrodes are coated with carboxylate terminated SAMs and positioned adjacent to catalytic sites.

Figure 16A:
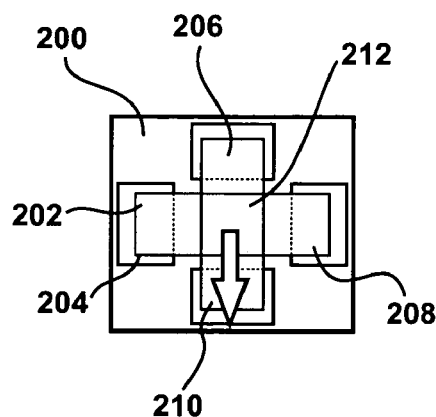
FIGS. 16A and 16B illustrate a reconfigurable microfluidic device.
Figure 16B:
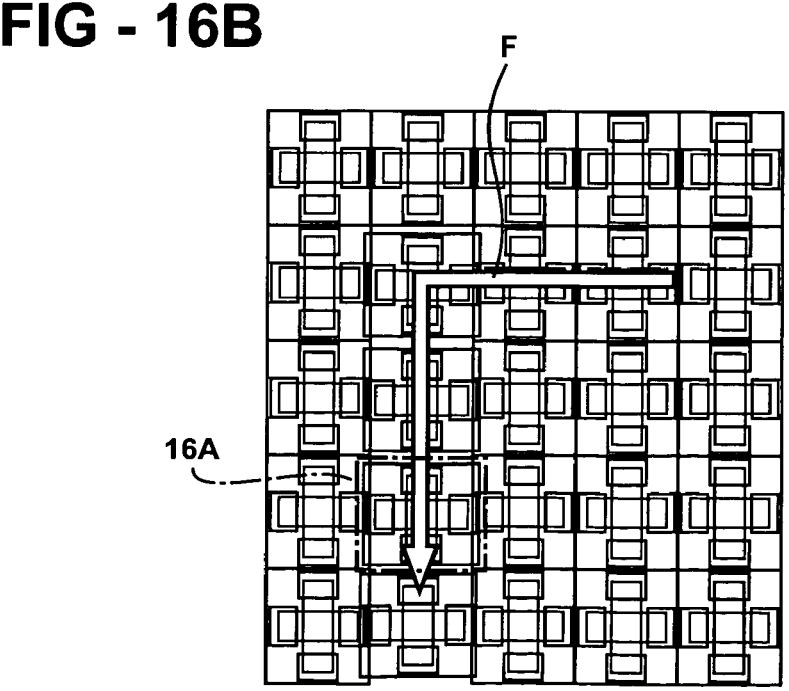

FIG. 16B shows a surface containing 25 unit cells, each, in effect, an individual reconfigurable microfluidic pump. A similar approach to reconfigurable catalytic engines was discussed above in relation to FIG. 13.

Each unit cell has four electrodes adjacent to a catalytic site and controls the direction of flow in that area. In this example, electrodes at positive potential are hydrophobic, activating the interfacial tension gradient between the hydrophobic area and the catalyst, inducing fluid flow away from the catalyst region.

FIG. 16A shows unit cell 200 having SAM-coated non-catalyst regions 202, 206, 208, and 210 surrounding a central catalyst region 212, with electrodes such as 204. If electrodes associated with non-catalyst regions 202, 206, and 208 have a negative potential (hydrophilic), and the electrode associated with the non-catalyst region 210 has a positive potential (hydrophobic), fluid flows in the direction shown by the arrow.

By applying positive potentials to selected electrodes, and keeping the other electrodes negative, a fluid pathway can be defined, for example as illustrated by the arrow F in FIG. 16B. This pathway can be reconfigured by changing electrode potentials.

Modeling

There are various possible mechanisms for the motion of Pt/Au rods in hydrogen peroxide solutions. Some can be eliminated very simply because they predict motion in the opposite direction to that observed. For example, "jet propulsion" mechanisms, in which oxygen generated at Pt impels the rod by momentum recoil or through a pressure increase, would propel the rods towards the Au end. Diffusiophoretic transport models of colloidal particles in a gradient of a neutral solute, also predict movement towards the Au end with a velocity two orders of magnitude slower than that observed experimentally. Thermally induced changes in the properties of the fluid (such interfacial tension or viscosity) can also be eliminated because the thermal conductivity of the solution is high, and the net forward force would be on the order of $10^{-4}$ pN. It is very straightforward to use the observed velocity to calculate the drag force on the cylindrical rods, which is on the order of $10^{-2}$ pN, and this must equal the propulsive force at constant velocity. However, these other mechanisms may be important in other systems.

A mechanism that can quantitatively account for the magnitude of the observed motion is the interfacial tension gradient generated along the length of the rod by evolution of oxygen at the Pt end. For structures of this size, it is not surprising that interfacial tension forces are large compared to inertial forces. Kim et al. have described a rotary motor based on electrically driven changes in the interfacial tension of a mercury drop. So called "camphor boats" are particles propelled by interfacial tension gradients, which are caused by the spreading of dissolved camphor at the air-water interface. For Pt/Au nanorods in $H_2O_2$ solutions, the oxygen generated disrupts the hydrogen bonding network of water, lowering the interfacial tension of the liquid at the Pt end of the rod. This sets up an interfacial tension gradient along the rod length, which is continuously re-established through catalysis as the rod moves through the fluid.

In order to treat this problem quantitatively, we have solved the convection-diffusion equation (1) in the limit where the diffusion time, $d^2/D$, is long compared to the convection time $d/v$, using appropriate boundary conditions for cylindrical rods.

$$\frac{\partial C}{\partial t} = -v \cdot \nabla C + D \nabla^2 C \qquad (1)$$

Here d is the characteristic length scale, D is the diffusion coefficient, v is the rod velocity, and C is the local concentration of oxygen. The approximation that diffusion dominates the mass transport of reagents in the catalytic reaction is valid for length scales L<100 µm, which is the case of our rods. For larger structures such as catalytically driven pumps and sensors, the convection term in equation 1 will need to be considered as well. The interfacial tension of the liquid can be related to the mole fraction of two components (A and B, in our case oxygen and water) using equation 2. Using this approximation and the experimentally measured generation rate of oxygen, we have obtained an otherwise parameter-free solution to the convection-diffusion equation, $$\gamma_{(A\&B)/X} = X_A \gamma_{A/X} + X_B \gamma_{B/X} \qquad (2)$$

which predicts an interfacial tension force of 0.01 pN in 2% aqueous $H_2O_2$. The calculated force agrees within a factor of two with the drag force obtained from the rod velocity. According to this solution, the steady-state velocity of the rod should scale approximately as:

$$v_z \sim \frac{SR^2 \gamma}{\mu D L} \qquad (3)$$

where S is the surface area normalized oxygen generation rate, R is the rod radius, γ is the interfacial tension, µ is the viscosity, D is the diffusion coefficient, and L is the length. As discussed above in relation to FIG. 2, for a set of ethanol-water solutions in which γ varies over a range of 20-80 mN/m, the rod velocity is directly proportional to γ. In the same solution, μ varies by a factor of two, but the product μD remains constant, and thus there is no net effect of μ on rod velocity. Scaling experiments in which R and L were varied support the dependence of velocity on S, R, γ, μD, and L given in equation 3 above. Hence there is good experimental support for the idea of a catalytically generated interfacial tension gradient that drives the movement of the rods.

We have observed that the movement of Pt/Au nanowires and gears in $H_2O_2$ solutions is towards the Pt end. In the interfacial tension model, a hydrophobic Au surface is needed to account for this direction of motion. If the Au surface is hydrophobic, then the free energy of the system is lowered by moving it from a fluid of higher interfacial tension (lower $O_2$ concentration) to one of lower interfacial tension. Two possible explanations are that the Au surface is covered by hydrophobic molecules acquired in handling, or that it is covered by oxygen nanobubbles, similar to those observed on silicon and other surfaces in contact with gas-saturated solutions. Tapping-mode atomic force microscopy (AFM) can be used to study the surface of nanorods in situ, and topographic and phase imaging can be used to determine whether the Au segments are covered with nanobubbles, and whether the surface is hydrophobic under the conditions of our experiments.

It is possible that catalytically generated oxygen coats the surface of the Au, perhaps in the form of nanobubbles, which have been observed by atomic force microscopy (AFM) in gas-saturated solutions on several kinds of hydrophobic surfaces. In this case, the interfacial energy at the Au surface is given by the liquid-vapor interfacial tension. The free energy of the system is minimized by moving this surface into the part of the fluid that has lower interfacial tension, i.e., by moving the rod in the direction of the catalytic Pt end. This model predicts motion in the opposite direction if the Au surface becomes hydrophilic. One of the key aspects of the fundamental studies we propose below is to test this model by attempting to image the Au surface by AFM, and to alter its surface chemistry rationally. The ability to modulate the magnitude of the catalytic force through surface chemistry is also a critical component of many of the proposed applications we describe below.

Structures can be prepared without a detailed model of the underlying reactions and effects. However, modeling allows optimization of structure structures. The interfacial tension model we use to describe the motion of catalytic nanorods accounts quantitatively for most of our observations. However, other mechanisms may be identified. A chemical reaction gives rise to a concentration gradient, which drives interfacial forces and motion. A chemical reaction occurring at an interface can actively sustain a non-equilibrium concentration gradient, and since it is only a relative motion which matters, we can equally well move fluid through a stationary channel whose walls are patterned appropriately with catalytically active surfaces.

The power dissipated by a motor is determined by the thermodynamics of the reaction being catalyzed, but the force thereby generated depends only on interfacial energetics. Since the energy associated with converting hydrogen peroxide to water plus dioxygen is much larger than energies associated with the dispersion forces and hydrogen bonding interactions at the metal/solution interface, the thermodynamic efficiency of the Pt—Au/hydrogen peroxide motor is quite low, a small fraction of one percent. Most of the energy released in the highly exothermic decomposition of hydrogen peroxide is immediately dissipated as heat. This is not necessarily a problem, since nanoscale systems do not require large energy inputs and a low efficiency is perfectly acceptable in many situations. Nevertheless, one can improve the efficiency in two ways: by using less exothermic reactions or by using reactions whose reactants and products induce larger changes in interfacial energetics. An example of the latter is the use of an organic base or esterase enzyme to catalyze the hydrolysis of relatively nonpolar esters to the polar molecules, e.g., alcohols (or phenols) and carboxylic acids.

A high efficiency may be desirable to reduce operating costs and to simplify the delivery of sufficient fuel via mass transport. The highest possible efficiencies would result from reactions that make or break weakly-bonded structures, since these interactions are at the same energy scale as the interfacial energetics themselves. The reactions should also involve large changes in solvation energies between reactants and products. For example, a reaction could cleave an amphiphilic species into hydrophobic and hydrophilic parts at a weak connecting bond. Similarly, if a reactant is composed of two halves, both of which are hydrophobic on the outside, but with hydrophilic cores that are shielded in the bonded state, then splitting the molecule to expose previously hidden hydrophilic groups will produce two surfactant molecules (e.g., ester hydrolysis to form alcohol and carboxylic acid). In both cases, one can obtain a large change in interfacial energetics for a relatively small free energy of reaction.

In some situations the maximum force attainable may be more important than the thermodynamics efficiency. To optimize the force, one still wants not only a large change in interfacial properties, but also a very rapid reaction so that large diffusional gradients are generated. In addition, one can design systems wherein different surfaces are catalytically active and act in concert to produce an increased gradient. An example would involve tandem catalysis where the product from one would be the substrate for the second and where the products are successively more polar, e.g. olefin to alcohol to carboxylic acid.

Both efficiency and maximum force can also be increased by introducing tapering, masking, variable-length sections or barriers in strategic locations to maximize concentration gradients while maintaining a rapid delivery of reactants to the catalytic surfaces. Shape dependences will include small-scale surface roughness to increase the catalyst area. However, the overall shape is also important. One means of seeing the importance of shape is to compare concentration profiles in different dimensionalities. At distance r from a point source, the concentration in the 3-D problem falls as 1/r, but in 1-D, linearly (with appropriate boundary conditions). Similarly, concentration profiles along motor surfaces will depend upon the geometry, especially regions with sharp points. It may be possible to design efficient motors using a single catalytic material (rather than two materials) by optimizing the shape. For instance, from the behavior of diffusion fields around an infinite cone, we expect that for catalytic cones with the same, but not too large, opening angle, a speed proportional to the length of the cone can be achieved over some range of sizes.

Surface chemical modification offers a versatile means of altering the surface properties of the relevant metals. Interfacial energies scale with surface area. Surfaces can be roughened, or made porous using e.g. sacrificial metals. The surface of the non-catalytic material can also be roughened. For example, by electroplating Ag/Au alloy segments and then etching away the silver, very high surface area porous Au can be obtained.

Structures can also include different shapes (e.g., triangles, rectangles, and the like), fabricated using any convenient technique such as contact photolithography and e-beam lithography.

A possible contributor to nanorod motion (which has been proposed but never realized for larger structures such as torpedoes and submarines) is electrohydrodynamic (EHD) pumping of fluid. The basic idea is that separate half-cell reactions (in this case, $H_2O_2$ reduction to water, and $H_2O_2$ oxidation to oxygen) occur at the two different metal surfaces, generating a flux of protons that migrate from the anode to the cathode and drag fluid with them. This ion flux may be estimated by measuring the relevant exchange current densities electrochemically at Pt and Au electrodes. An electronically insulating stripe (e.g., ZnS, CdS, or $SnO_2$) can be deposited between the catalyst and non-catalyst (e.g. Pt and Au) segments to block current flow in nanorods and other microstructures.

Other Embodiments

Scaling, geometries, and surface properties can be used to control energy efficiency, speed, and direction of motion. Motion can be switched or otherwise controlled using chemical, photochemical, electronic, and magnetic switching. A wide range of catalytic reactions can be used, including enzyme catalysis. Structures fabricated can include gears, shuttles, sensors, and microfluidic (including nanofluidic) pumps and valves based on mechanical forces produced by catalytic reactions.

Structures can be fabricated using various methods, including various forms of lithography. For example, patterns formed in thick film resist can be filled with metals, such as low melting temperature alloys such as Au/Sb (80%/20%) solder paste. Such structures can be heated to cure the solder paste and Pt/Nafion catalyst inks applied to appropriate sections of the structure. Structures can be released by dissolving the resist. The Pt catalytic surfaces, applied asymmetrically to the micromotors, will serve to propel these lithographically fabricated structures in 3% hydrogen peroxide solutions. Other lithography methods, stamping, and other microfabrication methods can be used, as are well known in the art. For example, bimetallic rod micromotors (such as nanomotors) can be formed by electrochemical template replication.

Microstructures can be integrated with electronic circuitry, for example by mounting on a silicon wafer. Microstructures can also be integrated with microfluidic systems. Devices, such as micromachines, can include one or more catalytic microstructures. Catalytic microstructures can include nanotubes or nanofibers, for example carbon nanotubes, polymer nanofibers, or nanowires. A catalyst region can be supported on one or more surface regions of a microstructure, or within a tubular structure. Microfluidic devices constructed according to the principles described herein may also be used for printing, optical switching (for example in combination with fiber optics), optical computing, and the like.

Hence, it is possible to power the motion of microstructures using catalytic reactions that create gradient-based forces. Nanomotors can be fabricated using catalytic reactions to provide continually generated interfacial tension gradients. The fabricated motors can be autonomous, in that they do not require external electric, magnetic, gravitational, or optical fields to provide propulsion. Energy is supplied locally and chemically.

There are a large number of metals, metal derivatives, and enzymes that can be used to catalyze a variety of reactions to generate forces (including interfacial tension gradient-based forces). By appropriate design, these forces can be translated into anisotropic body and/or surface forces. Depending on the shape of the structure and the placement of the catalyst, different kinds of motion (such as linear, rotational, or some combination of linear and rotational) can be achieved. The microengines (such as nano-engines) can, in turn, be tethered or coupled to other structures, including nano-sensors, nano-vehicles, and fluid channels in spatially defined ways using a variety of known techniques, thus leading to whole new classes of chemically powered microscale structures and machines.

Applications include motors for micromachines, static and roving sensors, delivery vehicles, and formation of patterns or arrays by spontaneous deposition of materials. The catalytic generation of interfacial gradients can also be used to move fluids, allowing the design of pumps and valves for nanofluidic and bio-chip structures.

Structures can be deposited in self-assembling films on an appropriate substrate, for example to form sensor arrays. Structures can be used deliver reagents to otherwise inaccessible locations, for example within biological systems. Structures can also be used to propel microscale structures (such as biological cells or their man-made analogs), sensors, or to induce fluid flow in biological systems.

A process for generating anisotropic forces that permit autonomous movement of a microstructure (such as a nanostructure) includes the fabrication of the microstructure having a spatially designed catalytic area, and exposing the microstructure to a medium in which a catalytic reaction can occur. The medium can be a fluid medium, such as an aqueous solution (such as a solution of hydrogen peroxide or glucose), or gas. The catalytic area can comprise a metal (such as a transition metal such as palladium or platinum, an alloy, and the like), a metal-derived material, an enzyme, or other catalyst.

Other embodiments will be clear to those skilled in the relevant arts. Examples presented are not intended to be limiting. There is no intent to dedicate any part of the specification to the public. As will be understood by those skilled in the art, elements of different illustrative examples can be combined in different combinations, and examples are not intended to be limited to a particular dimensional scale.

Having described our invention, we claim:

1. A method of providing a relative motion between a microstructure and a fluid medium, the method comprising:
    providing a catalyst region within the microstructure;
    providing a non-catalyst region within the microstructure, the non-catalyst region having an adjacent non-catalyst portion that is substantially adjacent to the catalyst region;
    providing a fluid medium, the fluid medium having a fluid component that provides a chemical reaction, the chemical reaction being catalyzed by the catalyst region; and
    exposing the microstructure to the fluid medium, so that the catalyst region and the adjacent non-catalyst portion are both exposed to the fluid medium,
    wherein the chemical reaction induces the relative motion between the fluid medium and the microstructure,
    the catalyst region including a transition metal, the adjacent non-catalyst portion including a gold surface,
    the chemical reaction inducing a flow of the fluid medium from the catalyst region to the adjacent non-catalyst portion.

2. The method of claim 1, wherein the fluid medium is an aqueous solution.

3. The method of claim 1, wherein the fluid component is hydrogen peroxide.

4. The method of claim 1, wherein the catalyst region contains palladium or platinum.

5. The method of claim 1, wherein the chemical reaction is an oxidation or reduction of the fluid component.

6. The method of claim 1, wherein the chemical reaction is a decomposition of the fluid component.

7. The method of claim 1, wherein the relative motion is use to induce an autonomous motion of the microstructure through the fluid medium, the autonomous motion being powered by the chemical reaction.

8. The method of claim 1, wherein the relative motion is used to induce flow of the fluid medium along a fluid pathway at least partially defined by the microstructure.

9. The method of claim 1, wherein the direction of relative motion is controlled by modifying a surface wetting properties of the adjacent non-catalyst portion.

10. The method of claim 1, further including the provision of an analyte binding agent on the adjacent non-catalyst region, the relative motion being modified by the binding of an analyte within the fluid medium to the analyte binding agent.

11. A method of providing a relative motion between a microstructure and a fluid medium, the method comprising:
providing a catalyst region within the microstructure;
providing a non-catalyst region within the microstructure, the non-catalyst region having an adjacent non-catalyst portion that is substantially adjacent to the catalyst region;
providing a fluid medium, the fluid medium having a fluid component that provides a chemical reaction, the chemical reaction being catalyzed by the catalyst region; and
exposing the microstructure to the fluid medium, so that the catalyst region and the adjacent non-catalyst portion are both exposed to the fluid medium,
wherein the chemical reaction induces the relative motion between the fluid medium and the microstructure,
the direction of relative motion being controlled by modifying a surface wetting properties of the adjacent non-catalyst portion,
wherein the relative motion provides a measurable force at a force sensor, the force sensor being used to detect a presence of the analyte.

12. The method of claim 1, wherein the relative motion is used to induce a rotation of the microstructure.

13. A microgear, the microgear providing autonomous rotational motion about a rotation center when the microgear is located in a fluid medium, the microgear comprising:
a central portion, the central portion including the rotation center; and
at least one gear tooth protruding from the central portion, wherein the gear tooth includes a catalyst region and a non-catalyst region, the rotational motion being induced by a chemical reaction of a component of the fluid medium, the chemical reaction being catalyzed by the catalyst region.

14. The microgear of claim 13, wherein the catalyst region has an catalyst interface with the non-catalyst region, wherein the catalyst interface has a catalyst interface portion extending substantially radially from the central portion,
the chemical reaction inducing a flow of the fluid medium over the catalyst interface portion, the flow of the fluid medium providing the rotational motion.

15. The microgear of claim 13, wherein the central portion is substantially disk shaped.

16. The microgear of claim 13, wherein the microgear has a plurality of gear teeth.

17. The microgear of claim 13, wherein each gear tooth includes a catalyst region and a non-catalyst region, the rotational motion being powered by a chemical reaction of a component of the fluid medium, the chemical reaction being catalyzed by the catalyst region of each gear tooth.

18. The microgear of claim 13, wherein the catalyst region includes a transition metal.

19. The microgear of claim 13, wherein the catalyst region includes platinum or palladium.

20. The microgear of claim 13, wherein the catalyst region includes an enzyme.

21. A method of providing a relative motion between a microstructure and a fluid medium, the method including
providing a catalyst region within the microstructure;
providing a non-catalyst region within the microstructure; and
exposing at least part of the microstructure to the fluid medium, so that the catalyst region and non-catalyst region are exposed to the fluid medium,
the fluid medium having a fluid component providing a chemical reaction catalyzed by the catalyst region,
wherein the chemical reaction induces the relative motion between the microstructure and the fluid medium,
the catalyst region comprising platinum or palladium,
the non-catalyst region including a gold surface, the non-catalyst region being substantially adjacent the catalyst region,
the chemical reaction inducing a flow of the fluid medium from the catalyst region to the non-catalyst region.

22. The method of claim 21, wherein the relative motion is provided by an interfacial tension gradient between the catalyst region and the non-catalyst region.

23. A method of providing a relative motion between a microstructure and a fluid medium, the method including
providing a catalyst region within the microstructure;
providing a non-catalyst region within the microstructure; and
exposing at least part of the microstructure to the fluid medium, so that the catalyst region and non-catalyst region are exposed to the fluid medium,
the fluid medium having a fluid component providing a chemical reaction catalyzed by the catalyst region,
wherein the chemical reaction induces the relative motion between the microstructure and the fluid medium,
wherein the relative motion between the microstructure and the fluid medium is a rotational motion, the catalyst regions being disposed within radially outwardly extending portions of a substantially disk shaped microstructure operating as a microgear.

24. The method of claim 21, wherein the microstructure is a component of a microfluidic pump,
wherein the chemical reaction induces a flow of the fluid medium over the microstructure.

25. The method of claim 21, wherein the relative motion is used to power the self-powered autonomous directional motion of the microstructure through the fluid medium.

26. The method of claim 21, wherein the self-powered autonomous directional motion of the microstructure is controlled by modifying a surface property of the non-catalyst region.

27. A microstructure, the microstructure providing a motion relative to a fluid medium when the microstructure is exposed to the fluid medium, the microstructure comprising:
a catalyst region, the catalyst region catalyzing a chemical reaction of a fluid component of the fluid medium;
a non-catalyst region, proximate to the catalyst region; and
a surface layer, supported by the non-catalyst region, wherein the surface layer provides tunable surface wetting properties, surface wettability determining the direction of the motion relative to the fluid medium, the microstructure being a component of a microfluidic device, the motion being used to provide a fluid flow of the fluid medium along a fluid pathway, the direction of the fluid flow being controllable by changing the surface wettability.

28. The microstructure of claim 27, wherein the surface wetting properties is changeable by an external stimulus, so as to provide a modification of the motion relative to a fluid medium.

29. The microstructure of claim 28, wherein the external stimulus includes irradiation of the surface layer by electromagnetic radiation.

30. The microstructure of claim 28, wherein the modification is a reversal of the motion relative to a fluid medium.

31. The microstructure of claim 28, wherein the external stimulus includes an electronic potential.

32. A microstructure, the microstructure providing a motion relative to a fluid medium when the microstructure is exposed to the fluid medium, the microstructure comprising:
a catalyst region, the catalyst region catalyzing a chemical reaction of a fluid component of the fluid medium;
a non-catalyst region, proximate to the catalyst region; and
a surface layer, supported by the non-catalyst region,
the surface layer providing tunable surface wetting properties, a surface wettability determining the direction of the motion relative to the fluid medium,
wherein the surface layer is a self assembled monolayer.

33. The self assembled monolayer of claim 32, wherein the self assembled monolayer is a (mercapto)hexadecanoic acid.

34. A microstructure, the microstructure providing a motion relative to a fluid medium when the microstructure is exposed to the fluid medium, the microstructure comprising:
a catalyst region, the catalyst region catalyzing a chemical reaction of a fluid component of the fluid medium;
a non-catalyst region, proximate to the catalyst region; and
a surface layer, supported by the non-catalyst region,
the surface layer providing tunable surface wetting properties, a surface wettability determining the direction of the motion relative to the fluid medium,
wherein the surface wetting properties are changeable by an interaction between the surface layer and an analyte within the fluid medium, the interaction providing a modification of the motion relative to the fluid medium, the modification allowing detection of the analyte.

35. The microstructure of claim 32, wherein the microstructure is a component of a self-powered micromachine capable of an autonomous directional motion through the fluid medium, the autonomous directional motion having a direction correlated with the surface wetting properties.

36. The microstructure of claim 32, wherein the direction of the autonomous directional motion is changeable through a controlled change in the surface wettability.

37. A microstructure, the microstructure providing a motion relative to a fluid medium when the microstructure is exposed to the fluid medium, the microstructure comprising:
a catalyst region, the catalyst region catalyzing a chemical reaction of a fluid component of the fluid medium;
a non-catalyst region, proximate to the catalyst region; and
a surface layer, supported by the non-catalyst region,
wherein the surface layer provides tunable surface wetting properties, the surface wetting properties determining the direction of the motion relative to the fluid medium,
wherein the microstructure is a component of a sensor mechanism, the motion relative to the fluid medium providing a detectable force on a force sensing mechanism, the detectable force being correlated with the surface wettability.

38. The microstructure of claim 37, wherein the surface wettability is changed through an interaction with an analyte within the fluid medium, a resulting change in the detectable force being used to sense the analyte.

39. The microstructure of claim 27, wherein the catalyst region includes a metal.

40. The microstructure of claim 39, wherein the metal is platinum or palladium, and the non-catalyst region includes a gold surface.

41. The microstructure of claim 27, wherein the catalyst region includes an enzyme.

* * * * *